US010692266B2

(12) United States Patent
Lewin

(10) Patent No.: US 10,692,266 B2
(45) Date of Patent: Jun. 23, 2020

(54) COLLISION DETECTION AND RESOLUTION IN VIRTUAL ENVIRONMENTS

(71) Applicant: Electronic Arts Inc., Redwood City, CA (US)

(72) Inventor: Christopher Charles Lewin, London (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/220,689

(22) Filed: Dec. 14, 2018

(65) Prior Publication Data

US 2019/0318522 A1    Oct. 17, 2019

(30) Foreign Application Priority Data

Apr. 11, 2018  (GB) .................................. 1806015.2

(51) Int. Cl.
*G06T 15/00* (2011.01)
*G06T 13/20* (2011.01)
*A63F 13/577* (2014.01)

(52) U.S. Cl.
CPC ............ *G06T 13/20* (2013.01); *A63F 13/577* (2014.09); *A63F 2300/643* (2013.01);
(Continued)

(58) Field of Classification Search
CPC . G06T 2210/21; G06T 19/00; G06T 2210/16; G06T 13/20; A63F 13/577;
(Continued)

(56) References Cited

U.S. PATENT DOCUMENTS 6,748,325 B1 *  6/2004  Fujisaki ................. G01C 21/00
                                                                701/301
7,353,149 B2 *  4/2008  Strunk .................... G06T 13/20
                                                                  703/7
(Continued)

OTHER PUBLICATIONS

Jiménez P, Thomas F, Torras C. 3D collision detection: a survey. Computers & Graphics. Apr. 1, 2001;25(2):269-85.*
(Continued)

*Primary Examiner* — Phu K Nguyen
(74) *Attorney, Agent, or Firm* — Middleton Reutlinger

(57) ABSTRACT

A non-transitory computer readable storage medium storing computer program code that, when executed by a processing device, cause the processing device to perform operations comprising: determining a first representative point, wherein the first representative point represents a first geometric primitive; determining a second representative point, wherein the second representative point represents a second geometric primitive; determining an initial distance between the first representative point and the second representative point; calculating a first displacement based on a velocity of the first representative point; calculating a second displacement based on a velocity of the second representative point; determining a separating direction between the first representative point and the second representative point; projecting the first displacement along the separating direction; projecting the second displacement along the separating direction; calculating a predicted minimum distance between the first representative point and the second representative point based on the projection of the first displacement along the separating direction, the projection of the second displacement along the separating direction and the initial distance between the first representative point and the second representative point; and in response to the predicted minimum distance being less than a threshold distance,
(Continued)

generating a collision constraint preventing penetration between the first geometric primitive and the second geometric primitive.

20 Claims, 10 Drawing Sheets

(52) U.S. Cl.
CPC ... *A63F 2300/6607* (2013.01); *G06T 2210/16* (2013.01); *G06T 2210/21* (2013.01)

(58) Field of Classification Search
CPC .............. A63F 13/42; A63F 2300/643; A63F 2300/6607; G06F 30/00
USPC ........................................................ 345/418
See application file for complete search history.

(56) References Cited

U.S. PATENT DOCUMENTS

| | | | | |
|---|---|---|---|---|
| 7,737,978 | B2 * | 6/2010 | Nakamura | A63F 13/10 345/473 |
| 7,773,098 | B2 * | 8/2010 | Okuno | G06F 3/0346 345/156 |
| 7,889,195 | B2 * | 2/2011 | Shih | G06F 3/016 345/419 |
| 8,576,222 | B2 * | 11/2013 | Handley | G06F 3/016 345/419 |
| 9,171,396 | B2 * | 10/2015 | Jenkins | G06T 15/40 |
| 9,183,676 | B2 * | 11/2015 | McCulloch | G06T 19/006 |
| 9,589,383 | B2 * | 3/2017 | Mueller-Fischer | G06T 13/20 |
| 9,852,538 | B2 * | 12/2017 | Jenkins | G06T 15/60 |
| 10,109,103 | B2 * | 10/2018 | Jenkins | G06T 15/40 |

OTHER PUBLICATIONS

Lewin, Cloth Self Collision with Predictive Contacts, Game Developers Conference, Mar. 19-23, 2018.*

Larsson T. Collision detection for continuously deforming bodies. Proceedings to Eurographics' 01. 2001.*

Analooee A, Azadi S, Kazemi R. Time Distance: A Novel Collision Prediction and Path Planning Method. arXiv preprint arXiv: 1907. 03244. Jul. 7, 2019.*

Müller M, Heidelberger B, Hennix M, Ratcliff J. Position based dynamics. Journal of Visual Communication and Image Representation. Apr. 1, 2007;18(2):109-18.*

* cited by examiner

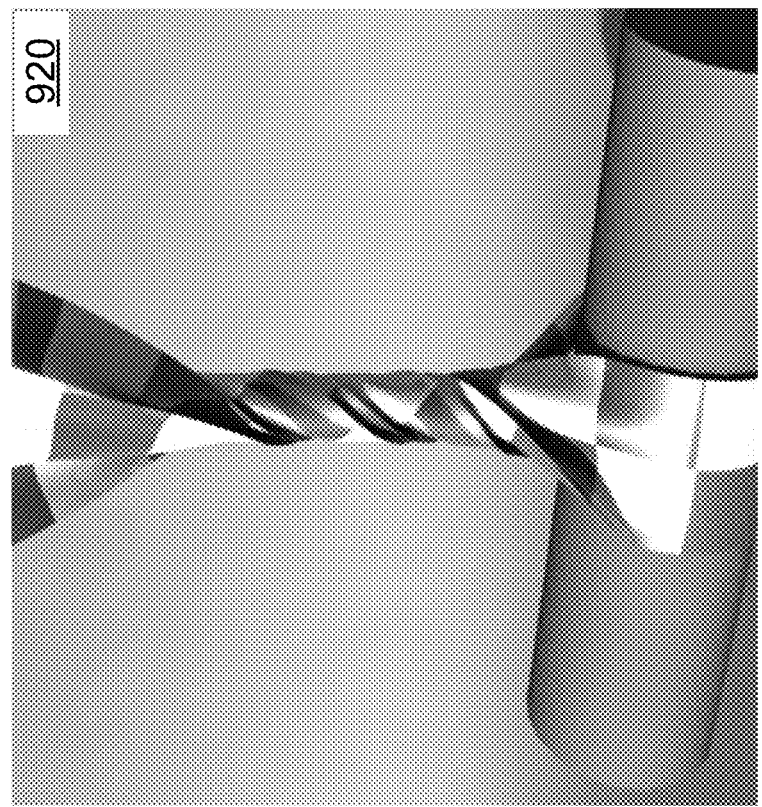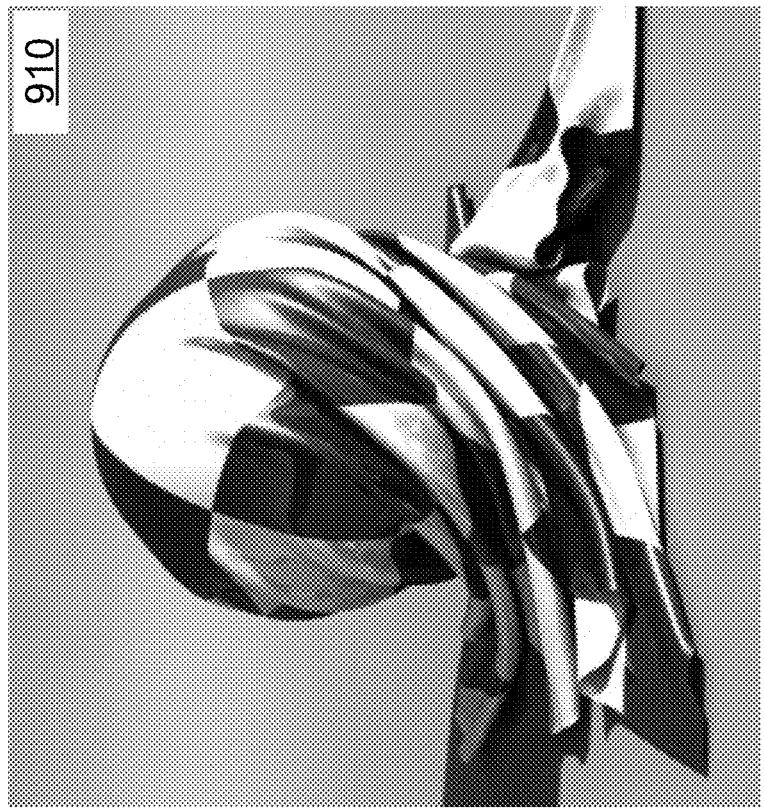

COLLISION DETECTION AND RESOLUTION IN VIRTUAL ENVIRONMENTS

FIELD OF THE INVENTION

The present invention relates to collision detection and resolution, and in particular to systems and methods for collision detection and resolution for soft-bodies in virtual environments such as video game environments.

BACKGROUND

Soft-body simulation, particularly cloth simulation, has become a desirable feature for video games that wish to be graphically competitive. Unlike simulations for film visual effects, video games provide real-time cloth simulations which have to operate under severe resource constraints and look good under all possible user input. In video games, cloth is often attached to characters that can move at superhuman speeds so the robustness requirements on the simulation can be quite restrictive. Real-time cloth simulation in video games, therefore, warrants different techniques from techniques used in work such as film rendering and academia.

SUMMARY

In accordance with a first aspect, the specification describes a non-transitory computer readable storage medium storing computer program code that, when executed by a processing device, cause the processing device to perform operations comprising: determining a first representative point, wherein the first representative point represents a first geometric primitive; determining a second representative point, wherein the second representative point represents a second geometric primitive; determining an initial distance between the first representative point and the second representative point; calculating a first displacement based on a velocity of the first representative point; calculating a second displacement based on a velocity of the second representative point; determining a separating direction between the first representative point and the second representative point; projecting the first displacement along the separating direction; projecting the second displacement along the separating direction; calculating a predicted minimum distance between the first representative point and the second representative point based on the projection of the first displacement along the separating direction, the projection of the second displacement along the separating direction and the initial distance between the first representative point and the second representative point; and in response to the predicted minimum distance being less than a threshold distance, generating a collision constraint preventing penetration between the first geometric primitive and the second geometric primitive.

In accordance with a second aspect, the specification describes a computer-implemented method for collision prediction. The method includes determining a first representative point. The first representative point represents a first geometric primitive. The method additionally includes determining a second representative point. The second representative point represents a second geometric primitive. The method further comprises: determining an initial distance between the first representative point and the second representative point; calculating a first displacement based on a velocity of the first representative point; calculating a second displacement based on a velocity of the second representative point; determining a separating direction between the first representative point and the second representative point; projecting the first displacement along the separating direction; projecting the second displacement along the separating direction; and calculating a predicted minimum distance between the first representative point and the second representative point based on the projection of the first displacement along the separating direction. The projection of the second displacement is along the separating direction and the initial distance is between the first representative point and the second representative point. In response to the predicted minimum distance being less than a threshold distance, a collision constraint preventing penetration between the first geometric primitive and the second geometric primitive is generated.

In accordance with a third aspect, the specification describes an apparatus. The apparatus comprises at least one processor and at least one memory. The at least one memory includes computer program code which, when executed by the at least one processor, cause the apparatus to: determine a first representative point, wherein the first representative point represents a first geometric primitive; determine a second representative point, wherein the second representative point represents a second geometric primitive; determine an initial distance between the first representative point and the second representative point; calculate a first displacement based on a velocity of the first representative point; calculate a second displacement based on a velocity of the second representative point; determine a separating direction between the first representative point and the second representative point; project the first displacement along the separating direction; project the second displacement along the separating direction; calculate a predicted minimum distance between the first representative point and the second representative point based on the projection of the first displacement along the separating direction, the projection of the second displacement along the separating direction and the initial distance between the first representative point and the second representative point; and in response to the predicted minimum distance being less than a threshold distance, generate a collision constraint preventing penetration between the first geometric primitive and the second geometric primitive.

BRIEF DESCRIPTION OF THE DRAWINGS

Certain embodiments of the present invention will now be described, by way of example, with reference to the following figures.

FIG. 9 illustrates results of two benchmark cloth self-collision tests when methods described herein are used for collision detection and resolution.

DETAILED DESCRIPTION

Figure 1:
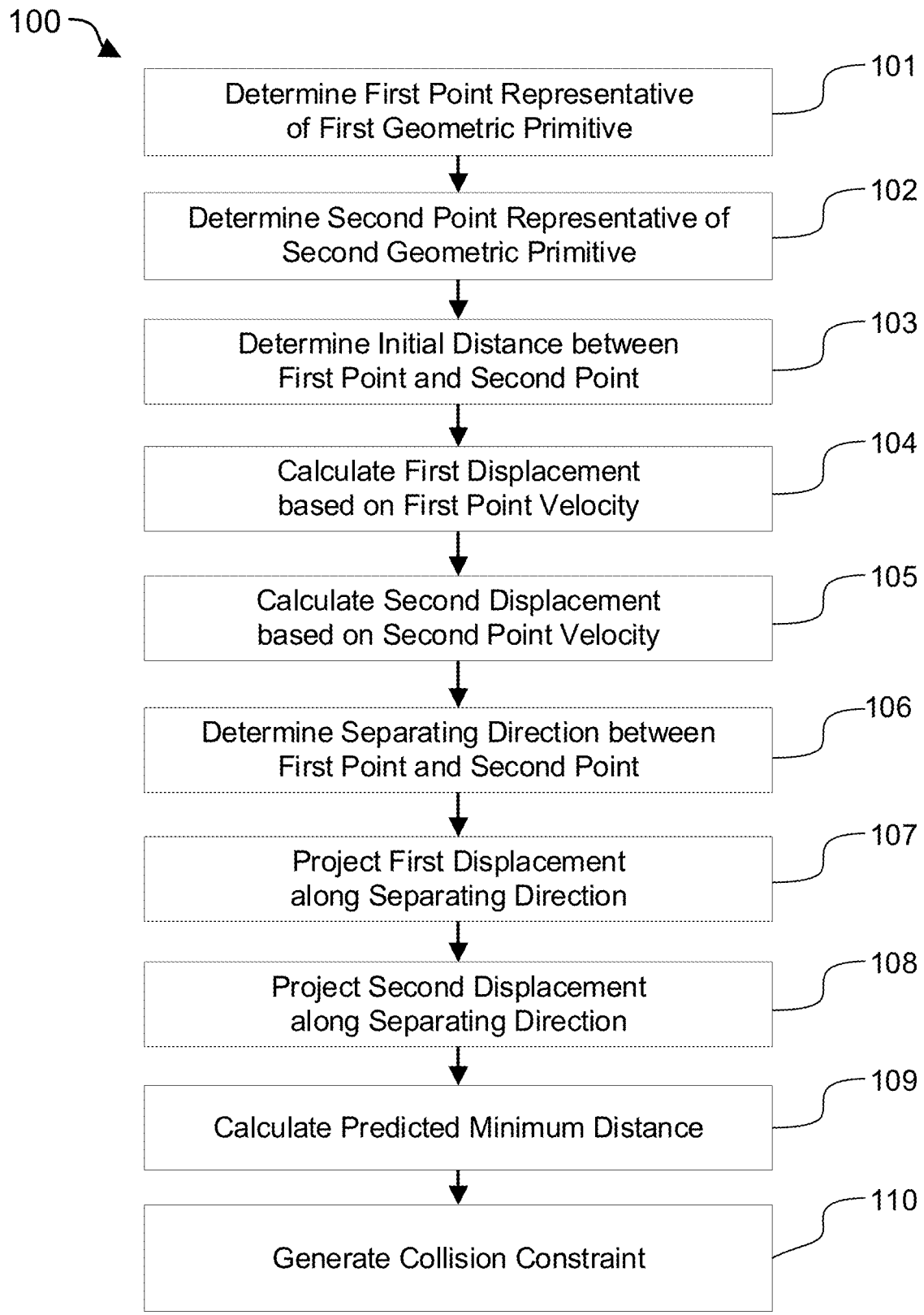
FIG. 1 is a flow diagram of an example method for predicting collisions between two geometric primitives.

Example implementations provide system(s) and method(s) for improved collision detection and resolution, e.g. for video game applications. For example, systems and methods described herein may improve the quality of cloth self-collision detection and resolution achievable within a limited computational resource budget.

In accordance with various example implementations, a simulated soft-body is represented using a mesh. The mesh is a collection of geometric primitives. These geometric primitives are: points, i.e. vertices; edges; and faces, e.g. triangles. The collection of primitives defines the 3D shape of the simulated soft-body. When movement of the simulated soft-body occurs, a geometric primitive of the simulated soft-body may collide with another geometric primitive of the same simulated soft-body or with a geometric primitive of another simulated soft-body. These collisions are detected using 'full mesh' collision detection. 'Full mesh' collision detection refers to detecting point-face collisions and edge-edge collisions.

As continuous full-mesh collision detection, i.e. determining precisely whether a collision will occur in a given time step, is computationally expensive, example implementations predict whether collisions between geometric primitives are likely to occur in a given time step. To predict whether a collision between two geometric primitives is likely to occur in a time step, points representative of each of the geometric primitives are determined. For example, each of the points may be the location on a respective edge which is closest to the other edge. The distance between the points is then calculated. Displacements for each point are also calculated. The displacements predict the movement of a given point on the premise that it continues moving with its current velocity. By projecting the displacements on to the separating direction between the two points, a minimum distance between the two points is predicted. If the predicted minimum distance is below a threshold distance then it is predicted that a collision is likely to occur. The threshold distance may be the sum of a static collision radius and radii of the geometric primitives. In response to a likely collision being predicted, a constraint is generated which prevents the two geometric primitives from penetrating each other.

Predicting collisions in the manner described uses significantly less computational resources than full-mesh continuous collision detection. Where geometric primitives each have an associated radius, continuous collision detection requires determining the time of closest approach between them. In the case of edge-edge collisions and point-face collisions, determining the time of closest approach can involve solving a sixth-order polynomial, which can be prohibitive in terms of computing resource utilisation. Even if simulation is simplified by assuming the primitives have no associated radii, determining whether a point passes through a face or an edge passes through another edge requires solving a cubic polynomial. In contrast, the present methods predict collisions using linear equations, which may be solved using comparatively few computational resources.

The described systems and methods are particularly advantageous in the context of video games. The expectations of graphical realism in video games are ever increasing making realistic simulation of soft-bodies, particularly cloth, desirable. Detecting collisions between soft-bodies and collisions of soft-bodies with themselves is an important factor in making such simulations realistic. However, simulations in video games operate under severe resource constraints as the simulation is typically performed in real-time on consumer hardware. By improving the quality of soft-body collision detection achievable within these severe resource constraints, the described systems and methods enable the realism of the simulation of soft-bodies and, hence, the graphical realism of video games to be greatly improved.

Collision Detection Method

FIG. 1 is a flow diagram of an example method by which likely collisions between two geometric entities may be predicted. The method is performed by executing computer-readable instructions using one or more processors of one or more computing devices. In some embodiments, the one or more computing devices are the computing device moo described with respect to FIG. 10.

In step 101, a first representative point is determined. The first representative point, $p_\alpha$, represents a first geometric primitive. The first geometric primitive may be a point or an edge. The first geometric primitive may be a component of a polygon mesh representing a three-dimensional objection in a virtual environment.

Where the first geometric primitive is a point, the first representative point, $p_\alpha$, may be the point itself or an approximation of it.

Where the first geometric primitive is an edge, the first representative point, $p_\alpha$, may be a closest point on the edge to a second geometric primitive. An edge has a first endpoint, $p_a$, and a second endpoint, $p_b$. As $p_\alpha$ is on the edge, it is a linear interpolation, referred to in the art as a 'lerp', of $p_a$ and $p_b$. Therefore, $p_\alpha = \text{lerp}(p_a, p_b, \alpha)$, where $\alpha$ is a floating point value between 0 and 1 chosen to minimise the distance between $p_\alpha$ and the second geometric primitive.

In step 102, a second representative point, $p_\beta$ is determined. The second representative point represents a second geometric primitive. The second geometric primitive may be an edge or a triangle. The second geometric primitive may be a component of a polygon mesh representing a three-dimensional objection in a virtual environment.

Where the second geometric primitive is an edge, the second representative point, $p_\beta$, may be a closest point on the edge to the first geometric primitive. The edge has a first endpoint, $p_c$, and a second endpoint, $p_d$. As $p_\beta$, is on the edge, it is a linear interpolation, referred to in the art as a 'lerp', of $p_c$ and $p_d$. Therefore, $p_\beta = \text{lerp}(p_c, p_d, \beta)$, where $\beta$ is a floating point value between 0 and 1 chosen to minimise the distance between $p_\beta$ and the first geometric primitive.

Where the second geometric primitive is a triangle, the second representative point, $p_\beta$, may be a closest point on the triangle to the first geometric primitive. The triangle may be defined using three points, i.e. its vertices, $(p_0, p_1, p_2)$. As $p_\beta$ is on the triangle, it is a barycentric interpolation of its vertices $(p_0, p_1, p_2)$. Therefore, $p_\beta = \beta_0 p_0 + \beta_1 p_1 + \beta_2 p_2$, where $\beta_0$, $\beta_1$ and $\beta_1$ are greater than 0, and their sum is equal to one, i.e. $\beta_0 + +\beta_2 = 1$, and $\beta_0$, $\beta 1$ and $\beta_2$ are chosen to minimise the distance between $p_\beta$ and the first geometric primitive.

In step 103, an initial distance, $l_i$, between the first representative point, $p_\alpha$, and the second representative point, $p_\beta$, is determined. The initial distance is the distance between the first representative point and the second representative point before any movement of the points occurs. The initial distance may be the Euclidean distance between the points.

In step 104, a first displacement, $d_\alpha$, is calculated based on a velocity, $v_\alpha$, of the first representative point. The first displacement may be a multiplication of the velocity by a time unit, $\delta_t$, i.e. $d_\alpha = \delta_t v_\alpha$. The time unit may be the length of a simulation time step and the velocity of the first representative point may be its velocity at the beginning of the simulation time step.

Where the first geometric primitive is a point, the velocity, $v_\alpha$, of the first representative point may be the velocity of the point or an approximation of it.

Where the first geometric primitive is an edge, the velocity, $v_\alpha$, of the first representative point may be the linear interpolation of the velocity of the first endpoint of the edge, $v_a$, and the velocity of the second endpoint of the edge, $v_b$, i.e. $v_\alpha = \text{lerp}(v_a, v_b, \alpha)$, where a is the floating point value chosen in determining the first representative point. The velocities of the endpoints are interpolated as the edges of simulated soft-bodies can be deformed, e.g. increase or decrease in length, so the velocities of the endpoints can be different.

In step 105, a second displacement, $d_\beta$ is calculated based on a velocity, $v_\beta$, of the second representative point. The first displacement may be a multiplication of the velocity by a time unit, $\delta_t$, which may be formulated as $d_\beta = \delta_t v_\beta$. The time unit may be the length of a simulation time step and the velocity of the second representative point may be its velocity at the beginning of the simulation time step.

Where the second geometric primitive is an edge, the velocity, $v_\beta$, of the second representative point may be the linear interpolation of the velocity of the first endpoint of the edge, $v_c$, and the velocity of the second endpoint of the edge, $v_d$, i.e. $v_\beta = \text{lerp}(v_c, v_d, \beta)$, where $\beta$ is the floating point value chosen in determining the second representative point. The velocities of the endpoints are interpolated as the edges of simulated soft-bodies can be deformed, e.g. increase or decrease in length, so the velocities of the endpoints can be different.

Where the second geometric primitive is a triangle, the velocity, $v_\beta$, of the second representative point may be a barycentric interpolation of the velocities of the vertices of the triangle ($v_0$, $v_1$, $v_2$), which may be formulated as $v_\beta = \beta_1 v_0 + \beta_1 v_1 + \beta_2 v_2$ where $\beta_b$, $\beta_1$ and $\beta_2$ are the values chosen in determining the second representative point. The velocities of the vertices are interpolated as the faces of simulated soft-bodies can be deformed, e.g. increase or decrease in size, so the velocities of the endpoints can be different.

In step 106, the separating direction of the first representative point and the second representative point is determined. The separating direction, $\hat{s}$, may be determined as the direction between the first representative point and the second representative point, i.e. the normalization of the vector between $p_\alpha$ and $p_\beta$. Therefore, the separating direction may be formulated as:

$$\hat{s} = \frac{p_\beta - p_\alpha}{\|p_\beta - p_\alpha\|}$$

In step 107, the first displacement is projected along the separating direction. The first projection, $l_\alpha$, of the first displacement is the component of the first displacement along the separating direction. The sign of the projection of the first displacement, i.e. whether it is positive or negative, may indicate the orientation of the projection along the separating direction. The projection of the first displacement may be calculated as $l_\alpha = d_\alpha \cdot \hat{s}$, i.e. the scalar product of the first displacement and the separating direction.

In step 108, the second displacement is projected along the separating direction. The projection, $l_\beta$, of the second displacement is the component of the second displacement along the separating direction. The sign of the projection of the second displacement, i.e. whether it is positive or negative, may indicate the orientation of the projection along the separating direction. The projection of the second displacement may be calculated as $l_\beta = d_\beta \cdot \hat{s}$, i.e. the scalar product of the second displacement and the separating direction.

In step 109, a predicted minimum distance, $l_m$ between the first representative point and the second representative point is calculated. The predicted minimum distance is based on the initial distance, the projection of the first displacement and the projection of the second displacement. The predicted minimum distance may be calculated as: $l_m = \max(l_i - (l_\beta - l_\alpha), 0)$. The predicted minimum distance is bounded at zero as zero is the minimum possible distance between the representative points.

In step 110, in response to the predicted minimum distance, $l_m$, being less than a threshold distance, $l_t$, a collision constraint is generated, where the collision constraint prevents penetration between the first geometric primitive and the second geometric primitive. The threshold distance may be a static collision radius, $r_s$; one of or the sum of a radius associated with the first geometric primitive, $r_\alpha$, and a radius associated with the second geometric primitive, $r_\beta$; or a sum of these, e.g. $r_s + r_\alpha + r_\beta$. In some embodiments, the radii of the geometric primitives are equals so $r_\alpha = r_\beta = r$ and the sum of these radii with the static collision radius is $r_s + 2r$.

Where the threshold distance is based on a static collision radius, $r_s$, the static collision radius may be chosen as to trade-off between the number of collision constraints spuriously generated, i.e. collision constraints generated where a collision does not occur; and the number of missed collisions, i.e. collisions which occur but for which a constraint is not generated causing geometric primitives to pass through one another or become entangled. The chosen trade-off may depend on the extent to which each of these factors affects the graphical fidelity and realism of a virtual environment employing embodiments of the described method.

Figure 4:
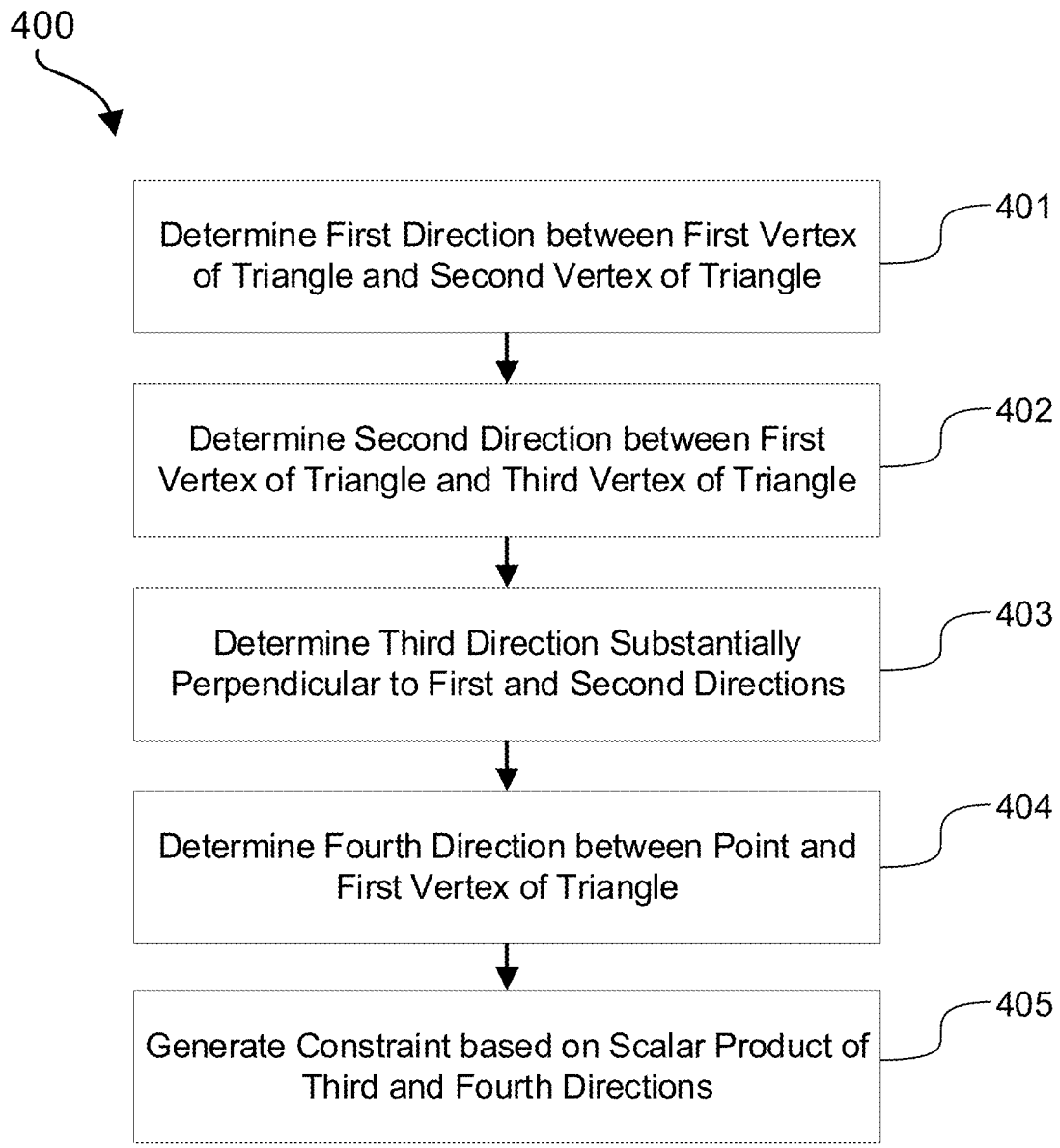
FIG. 4 is a flow diagram of an example method for generating collision constraints for predicted point-triangle collisions.
Figure 6:
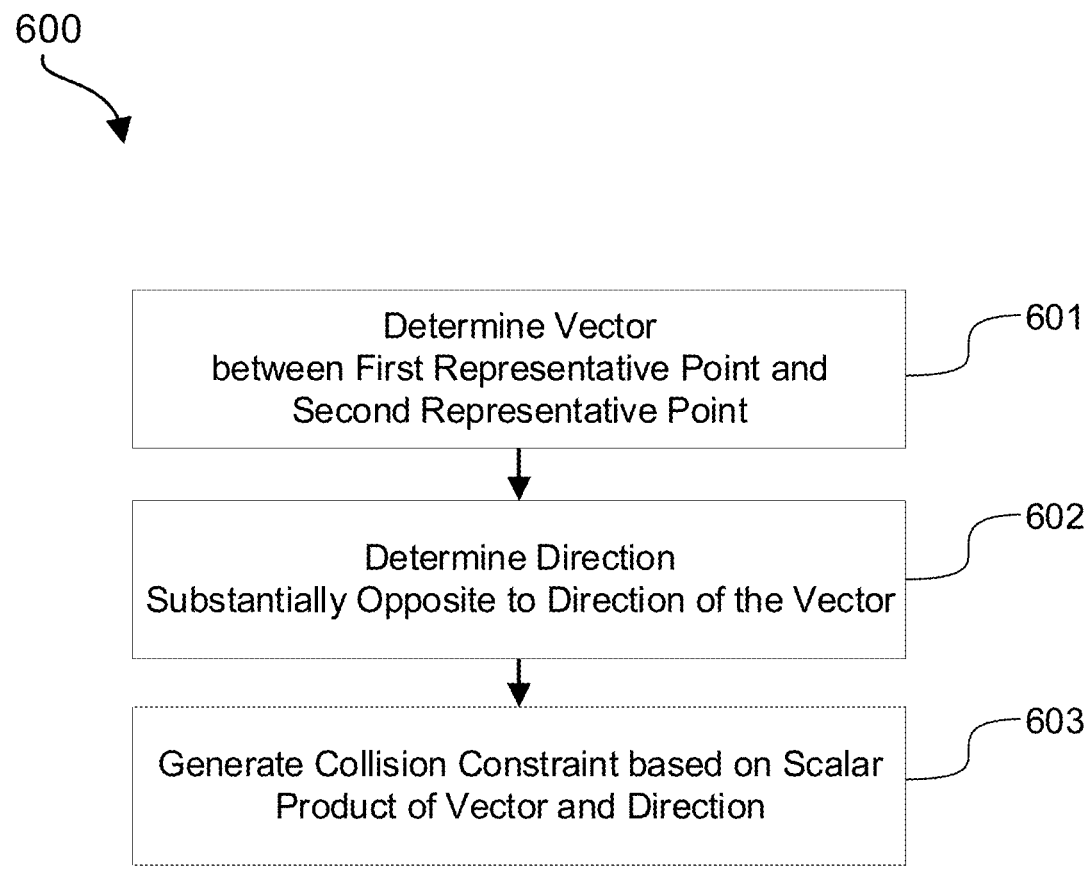
FIG. 6 is a flow diagram of an example method for generating collision constraints for predicted edge-edge collisions.

Methods by which the collision constraints may be generated are described with respect to FIG. 4 and FIG. 6.

Linear Approximation Graph

Figure 2:
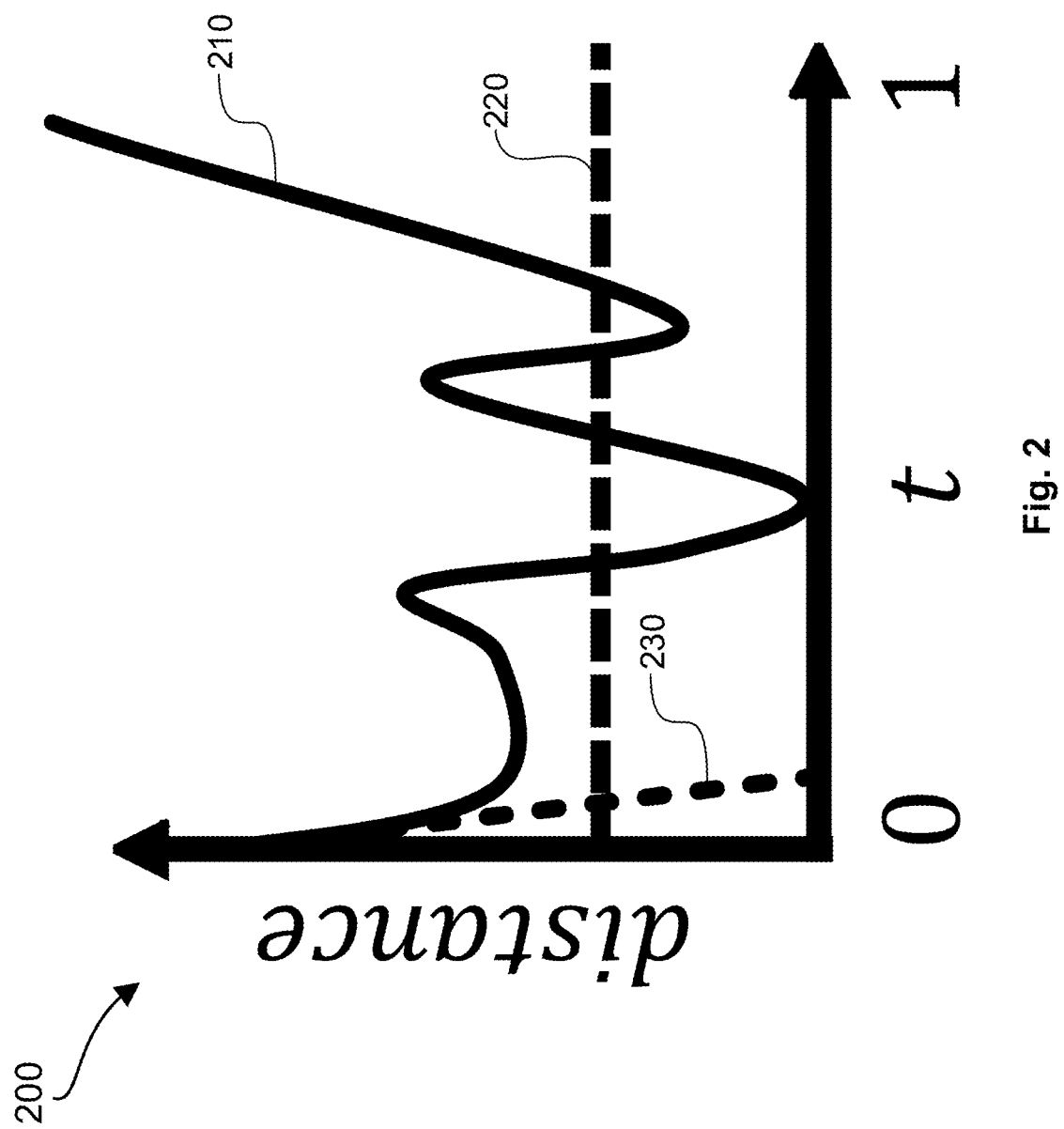
FIG. 2 is a graph illustrating a linear approximation of a predicted distance between two geometric primitives.

Referring to FIG. 2, a graph illustrating a linear approximation of a predicted distance between two geometric primitives is shown.

The graph 200 includes a distance line 210, a threshold line 220, and a linear approximation line 230. The time is indicated on the graph 200 by x-coordinates and distances are indicated by y-coordinates.

The distance line 210 represents a distance between two geometric primitives over the time unit. As the distance line 210 shows, the distance between the geometric primitives over the time unit is highly non-linear. In a virtual environment, such non-linearity arises from considering the independent movement of the points forming the primitives during the time step. Further complexity may arise from simulated forces being applied to a soft-body of which the geometric primitives are a part and/or from constraints applied to the geometric primitive. In the illustrated case, the minimum value of the distance line 230 is zero and, hence, a collision occurs.

The threshold line 220 represents a threshold distance. As previously described, in embodiments of the present invention, if a minimum distance between two geometric primitives is predicted to be less than the threshold distance, a collision constraint is generated.

The linear approximation line 230 represents a linear approximation of the distance between two geometric primitives. The linear approximation line 230 demonstrates that, as the minimum distance predicted by the linear approximation is below the threshold distance, it correctly predicts a collision and generates a collision constraint. This demonstrates that using a linear approximation of the distance, as employed by method methods described herein, can provide robust predictions of collisions in situations where the actual distance between two geometric primitives over a time unit is highly non-linear.

Predicted Point-Triangle Collision

Figure 3:
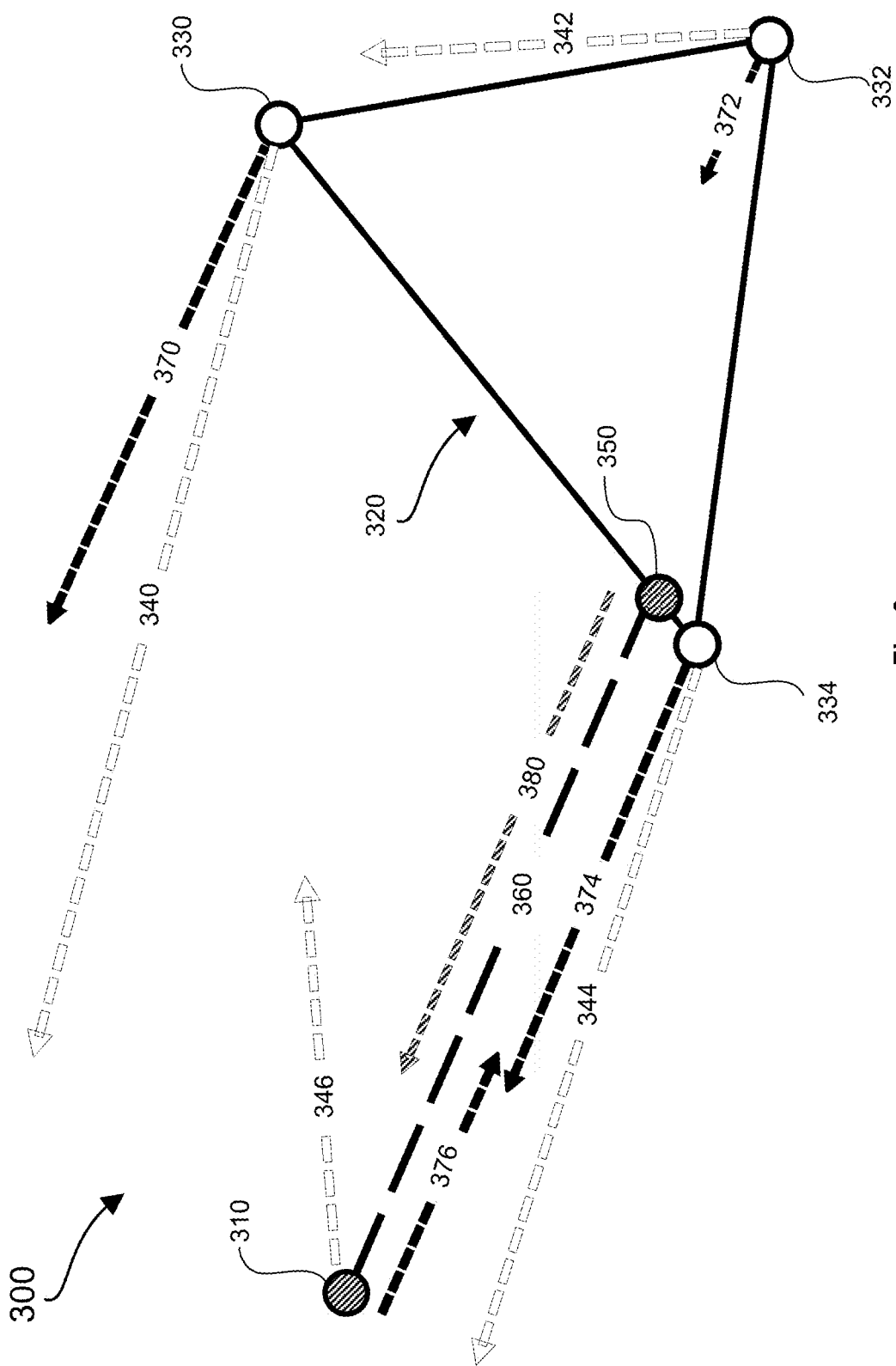
FIG. 3 is a diagram illustrating a predicted collision between a point and a triangle.

Referring to FIG. 3, a diagram illustrating a predicted collision between a point and a triangle is shown.

The diagram 300 includes a point 310 and a triangle 320, and shows their current locations and velocities in a situation where a collision would be predicted.

The point 310 is a geometric primitive and may be a component of a polygon mesh representing a three-dimensional object in a virtual environment. For example, the point 310 may be a vertex of a polygon mesh used to simulate a soft-body, such as cloth, in a video game.

The triangle 320 is a geometric primitive and may be a component of a polygon mesh representing a three-dimensional object in a virtual environment. For example, the triangle 320 may be a face of a deformable polygon mesh used to simulate a soft-body, such as cloth, in a video game.

The triangle 320 includes a first vertex 330, a second vertex 332 and a third vertex 334. Each of the vertices 330, 332 and 334 is predicted to move by a respective displacement 340, 342, 344 over a time unit, where the displacements may be a multiple of a respective velocity by the time unit. Where the triangle is a component of a polygon mesh used to simulate a soft-body, the velocities and, hence, the displacements 340, 342, 344 of each of the vertices 330, 332, 334 of the triangle may be different as soft-bodies are deformable so the shape and size of the triangle 320 may change.

The point 310 has a fourth displacement 346 which may be calculated as a multiple of the velocity of the point by the time unit.

The triangle contains a representative point 350 which is a point on the triangle closest to the point 310. As previously described, the representative point may be found using barycentric interpolation.

A line of separation 360 is shown between the point 310 and the representative point 350. The length of the line of separation 360 corresponds to the initial distance between the point 310 and the representative point 350. The direction of the line of separation 360 corresponds to the separating direction, i.e. the direction between the point 310 and the representative point 350.

Each of the displacements 340, 342, 344, 346 is projected along the separating direction to find projections 370, 372, 374, 376 of the respective displacements. These projections 370, 372, 374, 376 are the components of the displacements along the separating direction.

A projection 380 of the displacement of the representative point 350 along the separating direction is shown. As previously described, the projection 380 may be calculated by performing barycentric interpolation, using the parameters previously derived to determine the representative point 350, on the projections 370, 372, 374 of the displacements of the vertices.

The projection 356 of the displacement of the point and the projection 380 of the displacement of the representative point indicate that the predicted minimum distance between the point 310 and the triangle 320 is zero. Therefore, in the illustrated situation, a collision between the point and the triangle would be predicted.

Collision Constraint Generation Method

FIG. 4 is a flow diagram of an example method for generating collision constraints for a predicted collision between a point and a triangle, e.g. point-triangle collisions predicted according to method 100. The method is performed by executing computer-readable instructions using one or more processors of one or more computing devices. In some embodiments, the one or more computing devices are the computing device 1000 described with respect to FIG. 10.

In step 401, a first vector, $v_0$, between a first vertex, $p_0$, and a second vertex, $p_1$ of a triangle is determined. The first direction may be the difference between the second vertex and the first vertex, $p_1-p_0$.

In step 402, a second vector, $v_1$, between the first vertex, $p_0$, and a third vertex, $p_2$ of the triangle is determined. The second vector may be the difference between the third vertex and the first vertex, $p_2-p_0$.

In step 403, a third vector, $v_2$, between the first vertex, $p_0$, of the triangle and the point, p, is determined. The third vector may be the difference between the first vertex and the point, $p-p_0$.

In step 404, a perpendicular direction, $\hat{n}$, which is substantially perpendicular to the first vector and the second vector, is determined. The third vector may be the normalized cross product or the negation of their normalized cross product, i.e.

$$\pm \frac{v_0 \times v_1}{\|v_0 \times v_1\|}.$$

Whether the perpendicular direction is negated may be determined based on the so-called 'sidedness' of the predicted collision, i.e. the side of the triangle that the point is initially on when the collision is predicted, as to keep the point on this same side of the triangle.

In step 405, a collision constraint is generated based on the scalar product of the perpendicular direction and the third vector, $\hat{n} \cdot v_2$, which may be used to prevent penetration between the point and the triangle. The collision constraint may be:

$$C(p,p_0,p_1,p_2)=\hat{n} \cdot v_2-(r_\alpha+r_\beta) \geq 0$$

where $r_\alpha$ is a radius associated with the point and $r_\beta$ is a radius associated with the triangle. In some embodiments, these radii may be the same, i.e. $r_\alpha=r_\beta=r$, in which case the collision constraint may be:

$$C(p,p_0,p_1,p_2)=\hat{n} \cdot v_2-2r \geq 0$$

A virtual environment simulators using partial derivatives of the collision constraints with respect to the points forming the geometric primitives can enforce and solve the constraint. For the above constraint these derivatives are:

$$\frac{\partial C}{\partial p} = \hat{n}$$

$$\frac{\partial C}{\partial p_0} = (p_1 - p_2) \times \mathbb{N}\hat{n} - \hat{n}$$

$$\frac{\partial C}{\partial p_1} = (p_2 - p_0) \times \mathbb{N}\hat{n}$$

$$\frac{\partial C}{\partial p_2} = (p_1 - p_0) \times \mathbb{N}\hat{n}$$

where $\mathbb{N}$ is the geometric stiffness matrix:

$$\frac{d\hat{n}}{dn} = \frac{(\mathbb{I} - \hat{n}\hat{n}^T)}{\|n\|}$$

where n is the perpendicular vector:

$$\pm(v_0 \times v_1) = \pm((p_1 - p_0) \times (p_2 - p_0))$$

and the sign of n matches that of the perpendicular direction, ft.

Edge-Edge Collision

Figure 5:
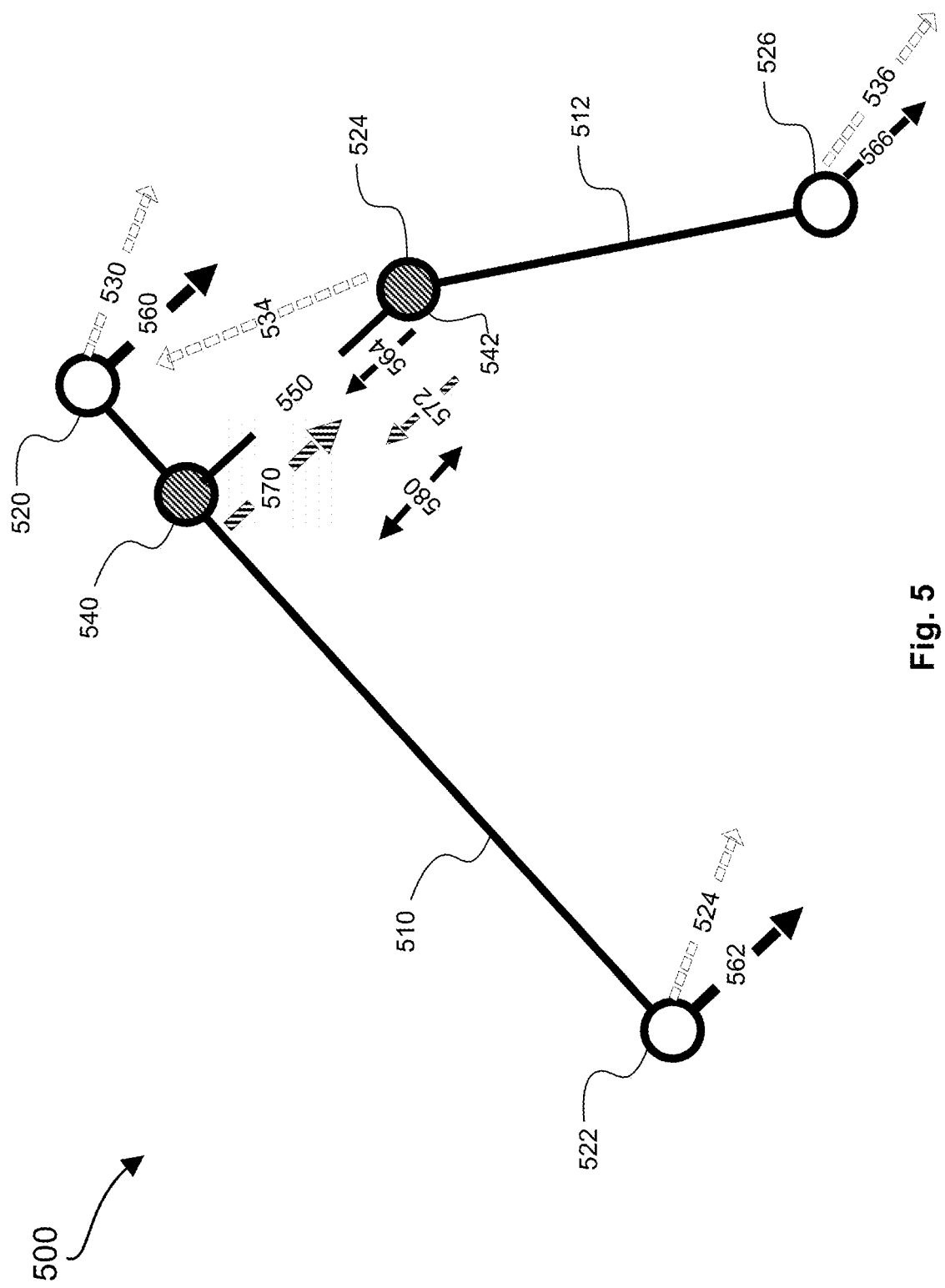
FIG. 5 is a diagram illustrating a predicted collision between two edges.

Referring to FIG. 5, a diagram illustrating a predicted collision between two edges is shown.

The diagram 500 includes a first edge 510 and a second edge 512, and shows their current locations and velocities in a situation where a collision would be predicted.

The first edge 510 is a geometric primitive and may be a component of a polygon mesh representing a three-dimensional object in a virtual environment. For example, the first edge 510 may be an edge of a polygon mesh used to simulate a soft-body, such as cloth, in a video game.

The first edge 510 includes two endpoints 520, 522 indicating the two ends of the edge. Each of the endpoints 520, 522 is predicted to move by a respective displacement 530, 532 over a time unit, where the displacements may be a multiple of a respective velocity by the time unit. Where the edge is a component of a polygon mesh used to simulate a soft-body, the velocities and, hence, the displacements 530, 532 of each of the endpoints 520, 522 of the edge may be different as soft-bodies are deformable so the size of the edge may change.

The second edge 512 is a geometric primitive and may be a component of a polygon mesh representing a three-dimensional object in a virtual environment. For example, the second edge 512 may be an edge of a polygon mesh used to simulate a soft-body, such as cloth, in a video game.

The second edge 512 includes two endpoints 524, 526 indicating the two ends of the second edge. Each of the endpoints 524, 526 is predicted to move by a respective displacement 534, 536 over a time unit, where the displacements may be a multiple of a respective velocity by the time unit. Where the edge is a component of a polygon mesh used to simulate a soft-body, the velocities and, hence, the displacements 534, 536 of each of the endpoints 524, 526 of the second edge may be different as soft-bodies are deformable so the size of the edge may change.

The first edge contains a first representative point 540 which is a point on the first edge closest to the second edge. As previously described, the representative point may be found using linear interpolation.

The second edge contains a second representative point 542 which is a point on the second edge closest to the first edge. As previously described, the representative point may be found using linear interpolation. In the situation illustrated, the closest point is the endpoint 524. Hence, the second representative point 542 and the endpoint 524 are the same point.

A line of separation 550 is shown between the first representative point 540 and the second representative point 542. The length of the line of separation 540 corresponds to the initial distance between the representative points. The direction of the line of separation 540 corresponds to the separating direction, i.e. the direction between the two representative points.

Each of the displacements 530, 532, 534, 536 is projected along the separating direction to find projections 560, 562, 574, 576 of the respective displacements. These projections 570, 572, 574, 576 are the components of the displacements along the separating direction.

A projection 570 of the displacement of the first representative point 540 along the separating direction is shown. As previously described, the projection 570 may be calculated by performing linear interpolation, using the parameter previously derived to determine the first representative point 540, on the projections 560, 562 of the displacements of the endpoints.

A projection 572 of the displacement of the second representative point 542 along the separating direction is shown. As previously described, the projection 570 may be calculated by performing linear interpolation, using the parameter previously derived to determine the second representative point 542, on the projections 564, 566 of the displacements of the endpoints. In the situation shown the second representative point 542 is the endpoint 524 of the second edge, and so the projection 572 of the displacement of the second representative point is the projection 564 of the displacement of this endpoint.

The projection 570 of the displacement of the first representative point and the projection 572 of the displacement of the second representative point indicate that the predicted minimum distance between the first edge 510 and the second edge 512 is less than a threshold distance 580, e.g. a static collision radius. Therefore, in the illustrated situation, a collision between the first edge 510 and the second edge 512 would be predicted.

Edge-Edge Collision Constraint Generation Method

FIG. 6 is a flow diagram of an example method for generating collision constraints for a predicted collision between a first edge and a second edge, e.g. edge-edge collisions predicted according to method 100. The method is performed by executing computer-readable instructions using one or more processors of one or more computing devices. In some embodiments, the one or more computing devices are the computing device 1000 described with respect to FIG. 10.

The first edge has two endpoints ($p_a$, $p_b$) which may be used to define the edge. As described with respect to step 101 of FIG. 1, a first representative point, $p_\alpha$, representing the first edge may be determined by linearly interpolating between $p_a$ and $p_b$ with a parameter, $\alpha$, where $\alpha$ is chosen such that $p_\alpha$ is the closest point on the first edge to the second edge. The first representative point may, therefore, be defined as:

$$p_\alpha = p_a + \alpha(p_b - p_a)$$

The second edge has two endpoints ($p_c$, $p_d$) which may be used to define the edge. As described with respect to step 102 of FIG. 1, a second representative point, $p_\beta$, representing the second edge may be determined by linearly interpolating between $p_c$ and $p_d$ with a parameter, $\beta$, where $\beta$ is chosen such that $p_\beta$ is the closest point on the second edge to the first edge. The second representative point may, therefore be defined as:

$$p_\beta = p_c + \beta(p_c - p_d)$$

In step 601, a vector, v, between the first representative point, $p_\alpha$, and the second representative point, $p_\beta$, is determined. The vector between the first representative point and the second representative point may be calculated as the difference between these two points, i.e. $p_\alpha - p_\beta$.

In step 602, a direction, n̂, that is substantially opposite to the direction to the direction of the vector is determined. The direction may be determined by negating and normalizing the vector, i.e.

$$-\frac{v}{\|v\|} = \frac{p_\beta - p_\alpha}{\|p_\beta - p_\alpha\|}.$$

In step 603, a collision constraint is generated based on the scalar product of the vector and the direction, v·n̂, which may be used to prevent penetration between the edges. The collision constraint may be:

$$C(p_a, p_b, p_c, p_d) = v \cdot \hat{n} - (r_\alpha + r_\beta) \geq 0$$

where $r_\alpha$ is a radius associated with the first edge and $r_\beta$ is a radius associated with the second edge. In some embodiments, these radii may be the same, i.e. $r_\alpha = r_\beta = r$, in which case the collision constraint may be:

$$C(p_a, p_b, p_c, p_d) = v \cdot \hat{n} - 2r \geq 0$$

A virtual environment simulator using partial derivatives of the collision constraints with respect to the points forming the geometric primitives can enforce and solve the constraint. For the above constraint these derivatives are:

$$\frac{\partial C}{\partial p_a} = -(1-\alpha)\hat{n}$$

$$\frac{\partial C}{\partial p_b} = -\alpha\hat{n}$$

$$\frac{\partial C}{\partial p_c} = (1-\beta)\hat{n}$$

$$\frac{\partial C}{\partial p_d} = \beta\hat{n}$$

Hardcoding Surface Sidedness

Figure 7:
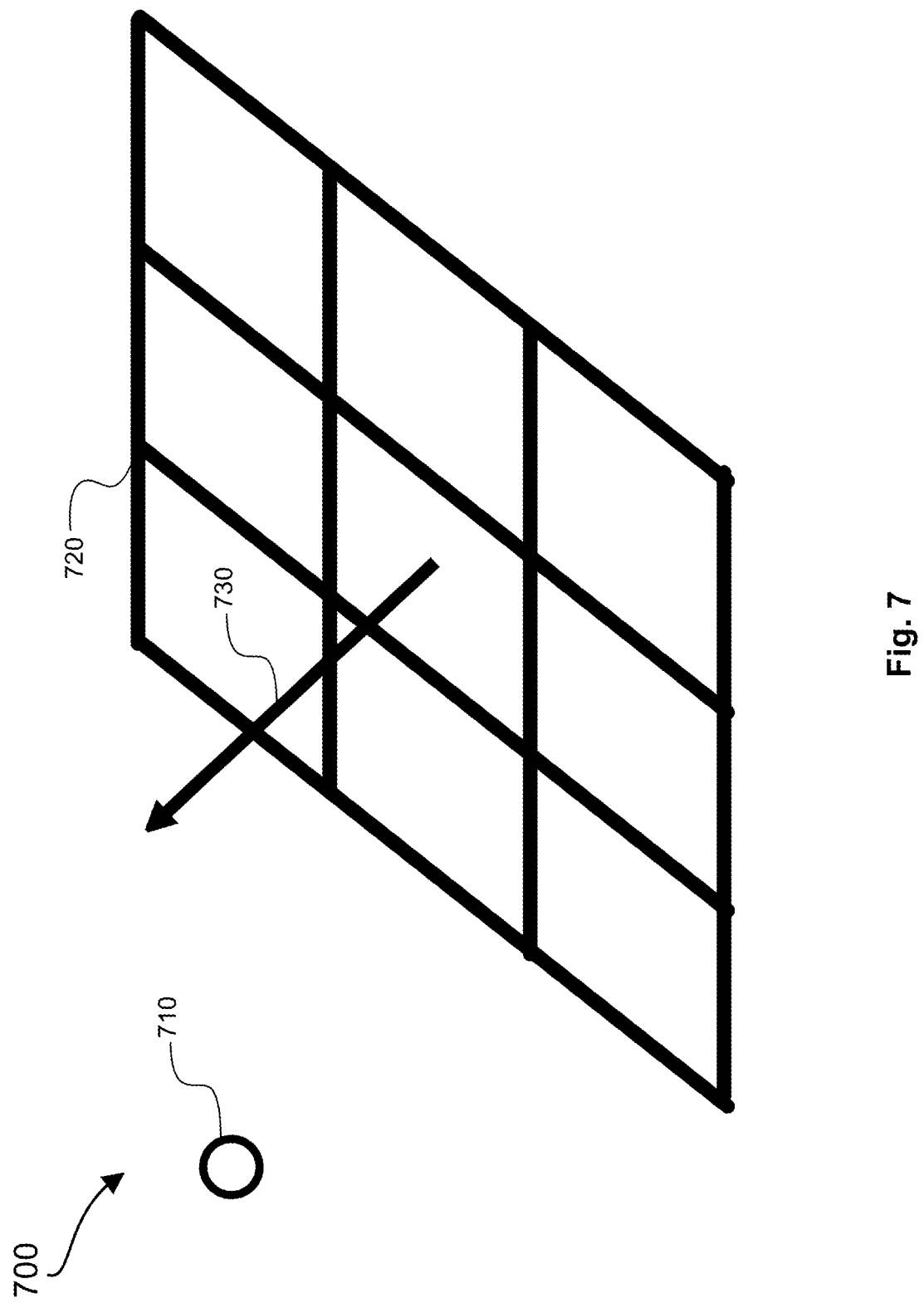
FIG. 7 is a diagram illustrating hardcoding a sidedness of a contact between layered surfaces.

Referring to FIG. 7, a diagram illustrating hardcoding the sidedness of a surface is shown.

The diagram 700 includes a point 710, a surface 720 and an indication 730 of a hardcoded surface sidedness.

The point 710 is a geometric primitive and may be a component of a polygon mesh representing a first three-dimensional object in a virtual environment. For example, the point 710 may be a vertex of a polygon mesh used to simulate a soft-body, such as cloth, in a video game. For instance, the soft-body may be the top layer of a flamenco skirt.

The surface 720 comprises a number of geometric primitives which may form a polygon mesh representing a second three-dimensional object in a virtual environment. For example, the surface 720 may be a lower layer of a flamenco skirt.

The indication 730 is a hardcoding of the sidedness of the surface 720, and indicates that the point 710 should remain above the surface 720. Where the surface 720 is part of a polygon mesh including triangles, the hardcoding may indicate that the point 710 should remain above these triangles. In an example embodiment, the point 710 is part of a polygon mesh for a top layer of a flamenco skirt and the surface 720 is part of a polygon mesh for a lower layer of the flamenco skirt, the indication 730 is part of a larger hardcoding that the top layer of the flamenco skirt should rest on the lower layer of the flamenco skirt.

An advantage of hardcoding the surface sidedness is that if a collision is not correctly predicted in a time unit, e.g. by the method 100, and the point 710 and the surface 720 become entangled, they can disentangle themselves. For example, where the point 710 has gone through the surface 720 in a previous time unit, the point can be returned to the correct side of the surface in the next time unit. As missed collisions can be rectified, it is acceptable to reduce the static collision radius used when predicting collisions such that collisions are occasionally missed. Reducing the static collision radius means fewer collision constraints are generated so less computational resources may be used to simulate the behaviour of the point and the surface. A reduced static collision radius may also decrease the number of spurious collisions generated which may improve the realism of the respective virtual environment.

Simulation of Clothing Flaps

Figure 8:
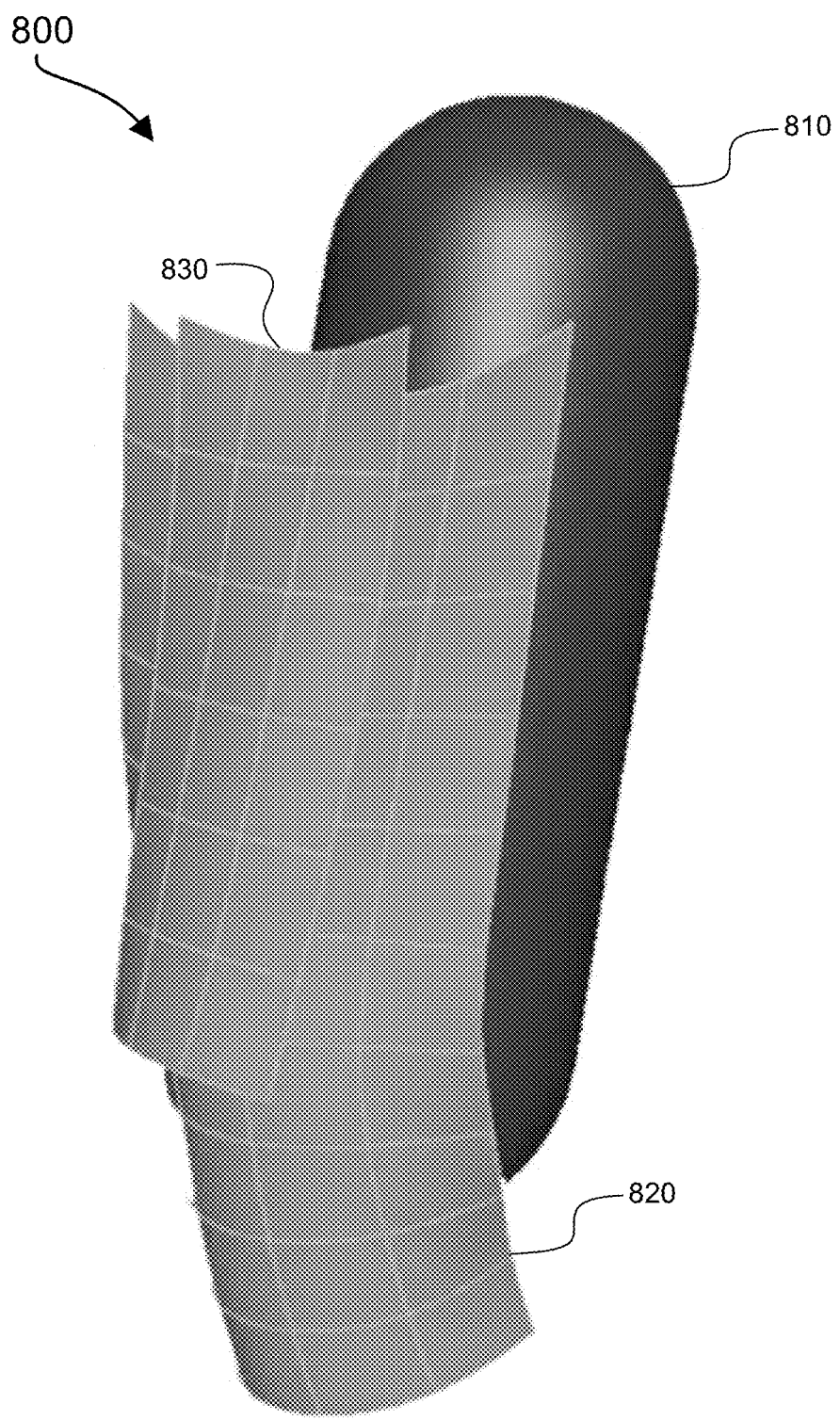
FIG. 8 is an illustration of a graphical simulation of two simple clothing flaps resting against a leg when methods described herein are used for collision detection and resolution.

Referring to FIG. 8, a diagram illustrating a graphical simulation of two simple clothing flaps resting against a leg when methods described herein are used for collision detection and resolution is shown.

The diagram 800 includes a cylinder 810 representing part of a leg, a polygon mesh 820 representing part of a lower clothing layer and a polygon mesh 830 representing part of an upper clothing layer.

The cylinder 810 is a simulated rigid body and may be represented as an edge having a large radius. The cylinder 810 represents a part of a leg, e.g. a thigh or crus, of a simulated character in a virtual environment.

The polygon mesh 820 includes vertices, edges and faces and is part of a simulated soft body. The polygon mesh 820 represents part of a lower clothing layer of the simulated character covering the part of the leg represented by the cylinder 810.

The polygon mesh 830 includes vertices, edges and faces and is part of a simulated soft body. The polygon mesh 830 represents part of an upper clothing layer of the simulated character covering the lower clothing layer of which a part is represented by polygon mesh 820.

In the situation shown, the collisions predicted between the cylinder 810 and the polygon mesh 820, and between the two polygon meshes 820, 830 may not change substantially between time units. Therefore, it may be possible to predict the collisions at an earlier stage during assembly, e.g. in the pipeline, or loading of the virtual environment and respectively store them in persistent or temporary storage. These stored collisions may then be used for collision resolution rather than collisions predicted each time unit. Thus, fewer computing resources may be used.

Self-Collision Tests

Referring to FIG. 9, a diagram illustrating results of two benchmark cloth self-collision tests when methods described herein are used for collision detection and resolution is shown.

The diagram 900 includes two renderings 910, 920 where each shows the renderings of a respective benchmark self-collision test produced using a virtual environment simulator employing the described collision detection and resolution methods, e.g. example method 100.

The first rendering 910 is of a virtual environment where cloth falls onto a rotating sphere. In the virtual environment, the cloth is a simulated soft-body comprising a number of geometric primitives, e.g. points, triangles and edges. The rotating sphere is a simulated rigid body and may be represented as a point having a large radius. As the sphere rotates, in addition to colliding with the sphere, the cloth will collide with itself, i.e. self-collide. As can be seen, the described methods enable these self-collisions to be accurately detected and resolved, hence rendered realistically. The described situation is used as a benchmark self-collision test because the cloth will bunch up as the sphere rotates causing many self-collisions between elements of the cloth so, if collisions are not correctly detected and resolved, the cloth will become entangled with itself, i.e. elements of the cloth will pass through other elements of the cloth rather than bunching up. Furthermore, if elements of the cloth remain on the wrong side of each other, other constraints and forces on the cloth may cause the cloth to behave unrealistically, e.g. float away.

The second rendering 920 is of a virtual environment where a cloth tape is wrapped around a twisting rod. In the virtual environment, the cloth tape is a simulated soft-body comprising a number of geometric primitives, e.g. points, triangles and edges. The rod is a simulated rigid body and may be represented as an edge having a large radius. As the rod rotates, the cloth tape will self-collide and become twisted. As can be seen, the described methods enable these self-collisions to be accurately detected and resolved, hence rendered realistically. The described situation is used as a benchmark self-collision test because the cloth will become knotted as the rod rotates causing many self-collisions between elements of the cloth so, if collisions are not correctly detected and resolved, the cloth will become entangled with itself, i.e. rather than the cloth becoming knotted, elements of the cloth will pass through each other. Furthermore, if elements of the cloth remain on the wrong side of each other, other constraints and forces on the cloth may cause the cloth to behave unrealistically, e.g. twist in a way that does not correspond to the rotation of the rod.

Computing Device

Figure 10:
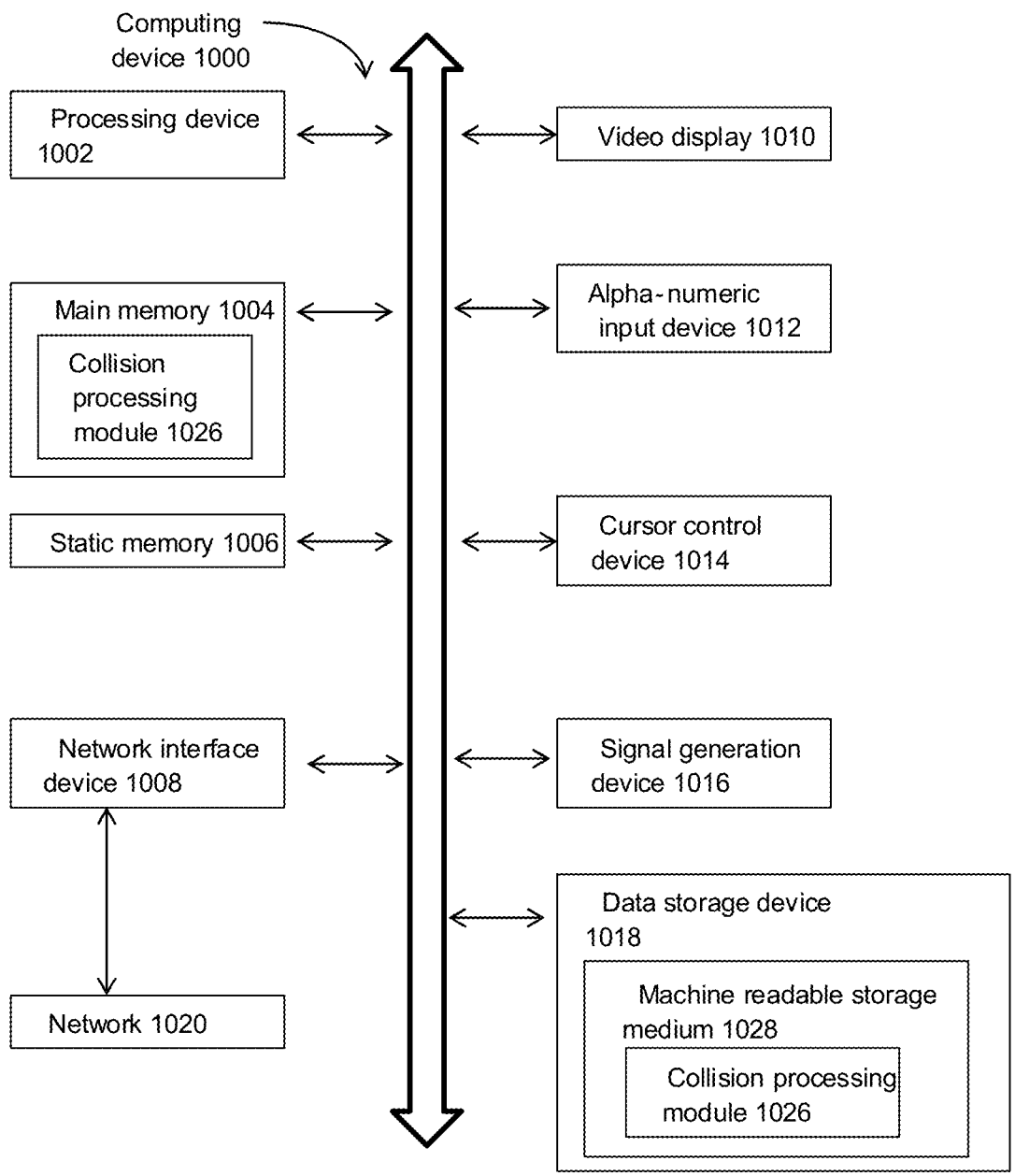
FIG. 10 is an illustration of a computing device for performing processes according to embodiments of the present specification.

Referring to FIG. 10, a diagrammatic representation of a computing device suitable for implementing the methods and systems described herein is shown.

A computing device 1000 may execute a set of instructions, for causing the computing device to perform any one or more of the methodologies discussed herein, may be executed. The computing device 1000 may be a computing device (e.g., a server computer) within which a set of instructions, for causing the computing to perform any one or more of the methodologies discussed herein, may be executed. In alternative embodiments, the computing device 1000 may be connected (e.g., networked) to other computing devices in a LAN, an intranet, an extranet, or the Internet. The computing device 1000 may operate in the capacity of a server machine in client-server network environment. The computing device 1000 may be a personal computer (PC), a set-top box (STB), a video games console, a server, a network router, switch or bridge, or any computing device capable of executing a set of instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein.

The example computing device 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 1002 is configured to execute collision processing module 1026 for performing the operations and steps discussed herein.

The computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1010 (e.g., a mouse) and a signal generation device 1016 (e.g., a speaker). In one embodiment, the video display unit 1010, the alphanumeric input device 1012, and the cursor control device 1010 may be combined into a single component or device (e.g., an LCD touch screen).

The data storage device 1018 may include a computer-readable storage medium 1028 on which is stored one or more sets of instructions (e.g., instructions of collision processing module 1026) embodying any one or more of the methodologies or functions described herein. The collision processing module 1026 may also reside, completely or at least partially, within the main memory 1004 and/or within the processing device 1002 during execution thereof by the computing device 1000, the main memory 1004 and the processing device 1002 also constituting computer-readable media. The instructions may further be transmitted or received over a network 1020 via the network interface device 1008.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by a computing device and that cause a computing device to perform any one or more of the methodologies of the present disclosure. The term "computer-readable storage medium" shall accordingly be taken to include, but not be limited to, solid-state memories, such as a solid-state drives and flash memory cards; digital magnetic media, such as hard disc drives; and optical media, such as and digital versatile discs and Blu-ray discs. Where the optical media is a Blu-ray disc, the optical media may be a disc including a video game program for a modern video game console. The computer-readable storage medium may also be a persistent storage medium of a game distribution system, i.e. a system from which a video game may be downloaded or streamed. For example, the computer-readable storage medium may be a hard disc drive of a file service for the Origin game distribution service, developed by Electronic Arts.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have a ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A non-transitory computer readable storage medium storing computer program code that, when executed by a processing device, cause the processing device to perform operations comprising:

determining a first representative point, wherein the first representative point represents a first geometric primitive, wherein the first geometric primitive is a first edge, and wherein determining the first representative point comprises determining the closest point on the first edge to a second edge;

determining a second representative point, wherein the second representative point represents a second geometric primitive, wherein the second geometric primitive is the second edge, and wherein determining the second representative point comprises determining the closest point on the second edge to the first edge;

determining an initial distance between the first representative point and the second representative point;
calculating a first displacement based on a velocity of the first representative point;
calculating a second displacement based on a velocity of the second representative point;
determining a separating direction between the first representative point and the second representative point;
projecting the first displacement along the separating direction;
projecting the second displacement along the separating direction;
calculating a predicted minimum distance between the first representative point and the second representative point based on the projection of the first displacement along the separating direction, the projection of the second displacement along the separating direction and the initial distance between the first representative point and the second representative point; and
in response to the predicted minimum distance being less than a threshold distance, generating a collision constraint preventing penetration between the first geometric primitive and the second geometric primitive.

2. The non-transitory computer readable storage medium of claim 1, wherein the threshold distance is based on a static collision radius.

3. The non-transitory computer readable storage medium of claim 1, wherein the threshold distance is based on a radius associated with at least one of the first geometric primitive and the second geometric primitive.

4. The non-transitory computer readable storage medium of claim 1, wherein the computer program code, when executed by the processing device, causes the processing device to perform calculating the first displacement by multiplying the velocity of the first point by a time unit.

5. The non-transitory computer readable storage medium of claim 1, wherein the computer program code, when executed by the processing device, causes the processing device to further perform:
generating a further collision constraint based on a stored indication of a predicted collision.

6. The non-transitory computer readable storage medium of claim 1, wherein the computer program code, when executed by the processing device, causes the processing device to perform:
determining the closest point on the first edge to the second edge by performing linear interpolation; and
determining the closest point on the second edge to the first edge by performing linear interpolation.

7. The non-transitory computer readable storage medium of claim 1, wherein the computer program code, when executed by the processing device, causes the processing device to perform generating the collision constraint by:
determining a vector between the first representative point and the second representative point;
determining a direction, wherein the second direction is substantially opposite to the direction of the vector; and
generating a constraint based on the scalar product of the vector and the direction.

8. The non-transitory computer readable storage medium of claim 1, wherein the non-transitory computer readable storage medium is a Blu-ray disc.

9. The non-transitory computer readable storage medium of claim 1, wherein the non-transitory computer readable storage medium is a persistent storage medium of a game distribution system.

10. A computer-implemented method for collision prediction comprising:
determining a first representative point, wherein the first representative point represents a first geometric primitive, wherein the first geometric primitive is a first edge, and wherein determining the first representative point comprises determining the closest point on the first edge to a second edge;
determining a second representative point, wherein the second representative point represents a second geometric primitive, wherein the second geometric primitive is the second edge, and wherein determining the second representative point comprises determining the closest point on the second edge to the first edge;
determining an initial distance between the first representative point and the second representative point;
calculating a first displacement based on a velocity of the first representative point;
calculating a second displacement based on a velocity of the second representative point;
determining a separating direction between the first representative point and the second representative point;
projecting the first displacement along the separating direction;
projecting the second displacement along the separating direction;
calculating a predicted minimum distance between the first representative point and the second representative point based on the projection of the first displacement along the separating direction, the projection of the second displacement along the separating direction and the initial distance between the first representative point and the second representative point; and
in response to the predicted minimum distance being less than a threshold distance, generating a collision constraint preventing penetration between the first geometric primitive and the second geometric primitive.

11. The computer-implemented method of claim 10, wherein the collision radius is a static collision radius.

12. The computer-implemented method of claim 10, wherein the threshold distance is based on a radius associated with at least one of the first geometric primitive and the second geometric primitive.

13. The computer-implemented method of claim 10, wherein calculating the first displacement is based on a velocity of the first representative point.

14. The computer-implemented method of claim 10, further comprising:
generating a further collision constraint based on a stored indication of a predicted collision.

15. The computer-implemented method of claim 10, wherein:
determining the closest point on the first edge to the second edge comprises performing linear interpolation; and
determining the closest point on the second edge to the first edge comprises performing linear interpolation.

16. The computer-implemented method of claim 10, further comprising:
determining a vector between the first representative point and the second representative point;
determining a direction, wherein the second direction is substantially opposite to the direction of the vector; and
generating a constraint based on the scalar product of the vector and the direction.

17. An apparatus comprising:
   at least one processor; and
   at least one memory including computer program code which, when executed by the at least one processor, cause the apparatus to:
      determine a first representative point, wherein the first representative point represents a first geometric primitive, wherein the first geometric primitive is a first edge, and wherein determining the first representative point comprises determining the closest point on the first edge to a second edge;
      determine a second representative point, wherein the second representative point represents a second geometric primitive, wherein the second geometric primitive is the second edge, and wherein determining the second representative point comprises determining the closest point on the second edge to the first edge;
      determine an initial distance between the first representative point and the second representative point;
      calculate a first displacement based on a velocity of the first representative point;
      calculate a second displacement based on a velocity of the second representative point;
      determine a separating direction between the first representative point and the second representative point;
      project the first displacement along the separating direction;
      project the second displacement along the separating direction;
      calculate a predicted minimum distance between the first representative point and the second representative point based on the projection of the first displacement along the separating direction, the projection of the second displacement along the separating direction and the initial distance between the first representative point and the second representative point; and
      in response to the predicted minimum distance being less than a threshold distance, generate a collision constraint preventing penetration between the first geometric primitive and the second geometric primitive.

18. The apparatus of claim 17, wherein the apparatus is a video game console.

19. The apparatus of claim 17, wherein the threshold distance is based on a static collision radius.

20. The apparatus of claim 17, wherein the threshold distance is based on a radius associated with at least one of the first geometric primitive and the second geometric primitive.

* * * * *

UNITED STATES PATENT AND TRADEMARK OFFICE
CERTIFICATE OF CORRECTION

PATENT NO. : 10,692,266 B2  
APPLICATION NO. : 16/220689  
DATED : June 23, 2020  
INVENTOR(S) : Christopher Charles Lewin Page 1 of 1

It is certified that error appears in the above-identified patent and that said Letters Patent is hereby corrected as shown below:

In the Specification

In Column 4, Line 25, delete "moo" and insert -- 1000 --, therefor.

In Column 4, Line 65, delete "β₀++β₂=1," and insert -- $\beta_0 + \beta_1 + \beta_2 = 1$, --, therefor.

In Column 5, Line 49, delete "v_β=β₁v_o+β₁v₁+β₂v₂" and insert -- $v_\beta = \beta_0 v_0 + \beta_1 v_1 + \beta_2 v_2$ --, therefor.

In Column 5, Line 49, delete "β_b," and insert -- $\beta_0$, --, therefor.

In Column 7, Line 5, delete "230" and insert -- 210 --, therefor.

In Column 9, Line 27, delete "ft." and insert -- $\hat{n}$. --, therefor.

In Column 10, Line 10, delete "540" and insert -- 550 --, therefor.

In Column 10, Line 12, delete "540" and insert -- 550 --, therefor.

In Column 11, Line 27, delete "$C(p_a,p_b,p_c,p_d)=v\cdot\hat{n}-(r_\alpha+r_\rho)\geq 0$" and insert -- $C(p_a, p_b, p_c, p_d) = v \cdot \hat{n} - (r_\alpha + r_\beta) \geq 0$ --, therefor.

In Column 15, Line 39, delete "reclassifying"" and insert -- "reclassifying" --, therefor.

In Column 15, Line 59, delete "electronics" and insert -- electronic --, therefor.

In Column 16, Line 2, delete "in" and insert -- is --, therefor.

In Column 16, Line 17, delete "a" and insert -- an --, therefor.

In Column 16, Line 38, delete "method" and insert -- methods --, therefor.

Signed and Sealed this  
Eighth Day of September, 2020

Andrei Iancu  
*Director of the United States Patent and Trademark Office*